UNITED STATES PATENT OFFICE.

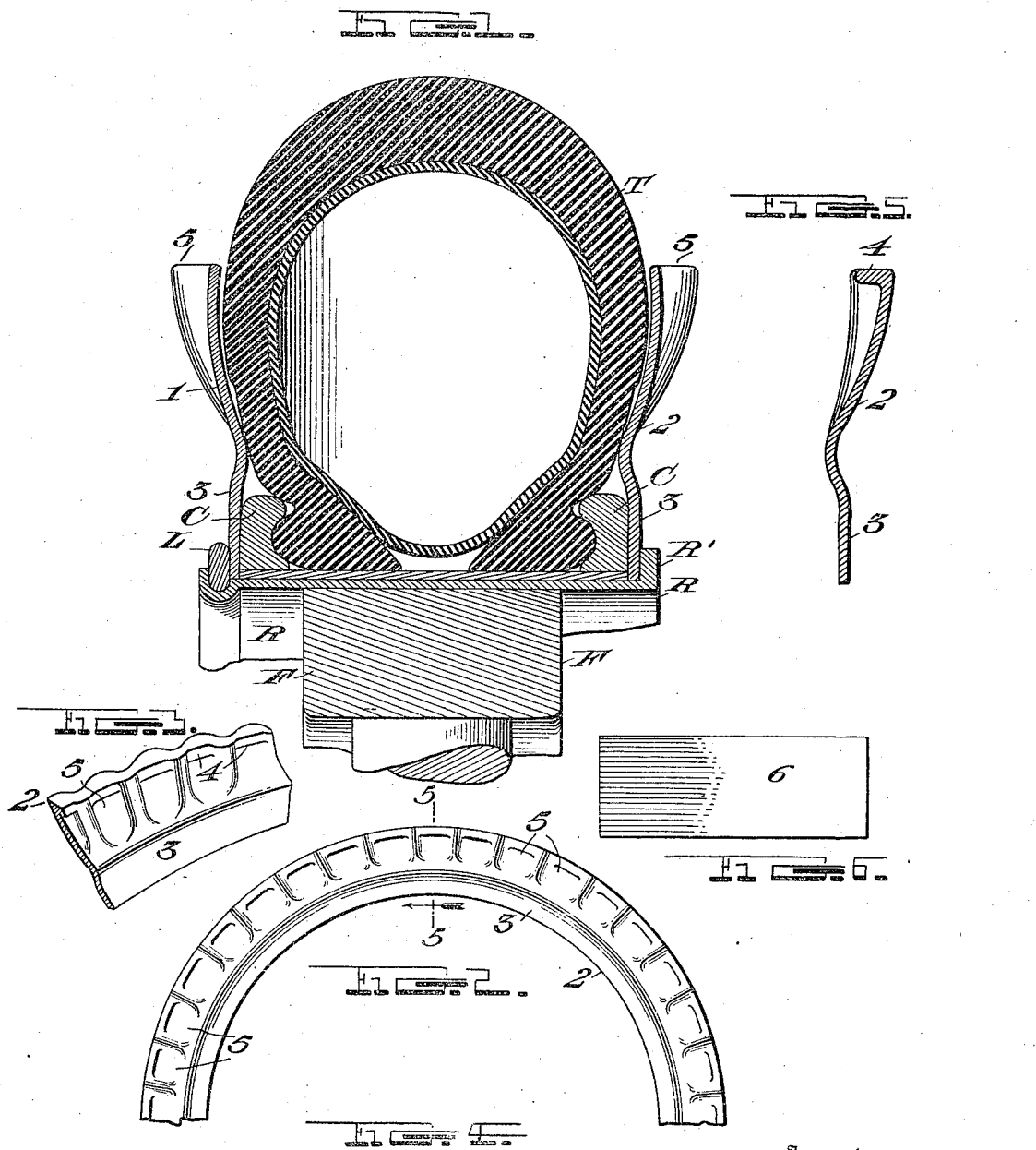

JOHN C. SCHLEICHER, OF MOUNT VERNON, NEW YORK.

TIRE-PROTECTOR.

1,141,585.      Specification of Letters Patent.      Patented June 1, 1915.

Application filed February 5, 1914. Serial No. 816,804.

*To all whom it may concern:*

Be it known that I, JOHN C. SCHLEICHER, a citizen of the United States, residing at Mount Vernon, in the county of Westchester and State of New York, have invented certain new and useful Improvements in Tire-Protectors; and I do declare the following to be a full, clear, and exact description of the invention, such as will enable others skilled in the art to which it appertains to make and use the same.

This invention relates to tire protectors especially adapted for use with pneumatic tires although it is susceptible for use with other resilient tires.

The object of the invention is to provide a simple inexpensive tire protector applicable to any wheel and so constructed that when a pneumatic vehicle tire bursts, is punctured or otherwise becomes deflated, resistive supports arranged rigidly around the wheel will be brought into use as treads thereby enabling the vehicle to continue its progress to a place where repairs may be conveniently made or a new tire substituted and thereby prevent rim cuts. Further, in case of accident to a tire when the vehicle is running at high speed, the supports will prevent sudden swerving of the vehicle from its course and injury to the vehicle and its occupants. Another function performed by the supports is that when a vehicle using them is passing over a soft or sandy road, they prevent the wheels from sinking unduly deep.

With these and other objects in view, the invention consists of certain novel features of construction, combination and arrangement of parts as will be more fully described and claimed.

In the accompanying drawings:—Figure 1 represents a transverse section through a tire of a vehicle equipped with this invention; Fig. 2 is a side elevation of a portion of one of the supports constituting the invention; Fig. 3 is an enlarged detail perspective view; Fig. 4 is a detail edge view of a portion of one of the plates or protectors; Fig. 5 is a transverse section taken on the line 5—5 of Fig. 2 looking in the direction of the arrow; and Fig. 6 is a plan view of one of the spacing plates.

In the embodiment illustrated a wheel felly F is shown having a metallic channeled rim R secured in any desired way to the felly and on which a pneumatic tire T is secured by the usual clencher rings C. The rim R is slightly wider than the tire which is adapted to be mounted thereon to enable it to receive and support the protector members to be described.

The improved tire protectors and supports constituting this invention comprise two annular plates 1 and 2 which are exactly alike in construction and therefore one only will be described in detail. The plate 2 has a flat inner portion 3 adapted to be disposed outside one of the clencher rings C between it and an upturned flange R' of the rim R. The remainder of this plate is made arcuate in cross section and has its peripheral edge bent laterally to form a flange 4 for broadening the tread. The arcuate portions of these plates 1 and 2 are each corrugated longitudinally to form a serpentine tread and pockets 5 disposed on the inner face of each plate which are adapted to snugly fit against the side walls of the tire T and when said tire becomes deflated, the weight of the load thereon will force it inwardly and the side walls thereof will become engaged with said pockets whereby the tire will be supported on opposite sides and permit it to collapse only a predetermined extent, the tread of the supports formed by the flange 4 contacting with the street or earth over which the vehicle is passing and thus relieving the tire from the weight of the load and preventing rim cuts such as usually occur when devices of this character are not employed.

Spacing elements in the form of plates 6 are shown arranged on the rim R between the flat portions 3 of the members 1 and 2 and are designed to space said members a proper distance apart and prevent their lateral collapse which is especially liable to occur during the assembling of the parts. A locking ring L is arranged in a flange formed at the side of the rim R opposite the flange R' thereof and it is designed to securely clamp the protector 1 between the outer face of the adjacent clencher ring and said locking ring.

When the tire is in normally inflated or distended condition the treads of the members 1 and 2 are disposed about midway the height of said tire and do not come in contact with the ground except when the wheels are running on soft or sandy soil. In the latter case such contact does occur and undue sinking of the wheels is prevented. When a tire is punctured or otherwise becomes deflated the load of the vehicle will cause said tire to move inwardly between the members 1 and 2 and to be forced into the pockets 5 as above described and the treads of these members 1 and 2 will extend beyond the tread surface of the deflated tire in position to act as treads for the wheel to relieve the tire of its supporting function. The weight imposed on the wheel is thus transferred from the tire to the tread members of the plates 1 and 2 and the vehicle may be driven to a suitable place for repairs without endangering the tires or the safety of the occupants.

I claim as my invention:

1. In a vehicle wheel, the combination with a rim having a deflatable tire mounted thereon, annular protecting plates secured to said rim on opposite sides of said tire and shaped to conform to the sides of a pneumatic tire when inflated, said plates having radially extending pockets on their inner faces to receive and support the side walls of a tire when deflated.

2. In a vehicle wheel, the combination with a rim having a deflated tire mounted thereon, annular protecting plates secured to said rim on opposite sides of said tire and shaped to conform to the sides of a pneumatic tire when inflated, said plates being corrugated to provide a serpentine tread with pockets on its inner face to receive and support the side walls of a tire when deflated.

3. In combination with a wheel rim having a pneumatic tire mounted thereon, annular plates secured to said rim on opposite sides of said tire, said plates each having a flat inner portion and its remaining portion arcuate in cross section and a laterally extending flange at the periphery of said arcuate portion, and corrugated to form a serpentine tread with pockets on its inner face.

In testimony whereof I have hereunto set my hand in presence of two subscribing witnesses.

JOHN C. SCHLEICHER.

Witnesses:
   EDW. A. PARTCH,
   ERWIN C. SCHLEICHER.